United States Patent [19]
Kenkel

[11] Patent Number: 5,604,845
[45] Date of Patent: Feb. 18, 1997

[54] METHOD FOR RECOVERY OF FAULTED PAGES IN A HOST BASED PRINTING SYSTEM

[75] Inventor: Vincent J. Kenkel, Boise, Id.

[73] Assignee: Hewlett-Packard Company, Palo Alto, Calif.

[21] Appl. No.: 533,597

[22] Filed: Sep. 25, 1995

[51] Int. Cl.⁶ .................................................. G06K 15/00
[52] U.S. Cl. .......................... 395/113; 395/102; 395/115
[58] Field of Search ................................... 395/101, 105, 395/113, 112, 114, 115, 116, 117, 108, 164, 165, 166, 102, 109; 358/404, 444, 298, 406; 355/202, 203, 204, 205, 206, 207, 208, 209; 347/19; 364/550

[56] References Cited

U.S. PATENT DOCUMENTS

| | | | |
|---|---|---|---|
| 3,852,580 | 12/1974 | Bailey et al. | 364/730 |
| 3,893,616 | 7/1975 | Trousdale | 395/105 |
| 3,990,559 | 11/1976 | Martin et al. | 395/105 |
| 4,062,648 | 12/1977 | Hennessee | 395/105 |
| 4,463,435 | 7/1984 | Cavill | 395/113 |
| 4,578,689 | 3/1986 | Spencer et al. | 347/129 |
| 4,776,097 | 11/1988 | Lake, Jr. | 346/139 C |
| 4,811,249 | 3/1989 | Marsh | 364/550 |
| 4,829,421 | 5/1989 | Ritchie | 395/250 |
| 4,833,626 | 5/1989 | Malcolm | 395/108 |
| 5,068,805 | 11/1991 | Tsuzuki | 395/164 |
| 5,193,008 | 3/1993 | Frazier et al. | 358/298 |
| 5,200,761 | 4/1993 | Kawakita et al. | 347/183 |
| 5,206,741 | 4/1993 | Shimura et al. | 358/404 |
| 5,239,313 | 8/1993 | Marko et al. | 358/298 |
| 5,487,138 | 1/1996 | Rust et al. | 395/115 |
| 5,490,237 | 2/1996 | Zimmerman et al. | 395/115 |

*Primary Examiner*—Edward L. Coles, Sr.
*Assistant Examiner*—Dov Popovici
*Attorney, Agent, or Firm*—Anthony J. Baca

[57] ABSTRACT

The present invention is a method for recovering a page that fails to print in a host based printing environment. In order to accomplish the present invention, first, if printer supports printing at a slower speed, the printer is slowed down. Next, if the printer cannot be slowed down or a page still faults while printing at the slowest speed, the resolution of the page is determined. If the resolution is a first resolution then the printer is checked to see if it has enough memory. Assuming there is enough memory, it is used to pre-buffer the page prior to starting the printer. If the resolution is a second resolution then first, if the printer has enough memory, try the pre-buffering method. If the page still faults then changing the page's resolution to the first resolution.

8 Claims, 2 Drawing Sheets

METHOD FOR RECOVERY OF FAULTED PAGES IN A HOST BASED PRINTING SYSTEM

CROSS-REFERENCE TO RELATED APPLICATION

The present application is related to the following co-pending U.S. patent application being assigned to the same assignee, entitled:

"A HOST BASED PRINTING SYSTEM WITH RASTER IMAGE DATA BUFFERING", Ser. No. 08/533,626, filed Sep. 25, 1995 incorporated herein by reference.

TECHNICAL FIELD

The present invention relates to host based printing systems, more particularly, method to increase the likelihood of printing those pages that cause a real time fault in the printing system.

BACKGROUND OF THE INVENTION

Host based printing, also referred to as "sleek" printing, is the concept of using the personal computers central processing unit (CPU) to render the printed image and send the rasterized image to the page printer. Currently there are two categories of printing systems, intelligent and dumb. The dumb category is the host based, or sleek, approach. The intelligent category differs in that it sends a mixture of rendered and non-rendered to the printer. It is similar to the concept of page description language (PDL) page printers like the Hewlett-Packard PCL page printers, in that the data sent across the I/O channel needs to be processed and rendered by the printer. A dumb printer only has to deal with placing an already rasterized image on paper, whereas the intelligent printer requires additional technology in the printer such as additional memory and processing power, to form the page for printing before starting the printing process.

One of the problems with host based printing is that it requires that the host be able to supply the rasterized data at the rate that the print engine consumes it. Otherwise, the printer runs out of data to put on the already moving paper causing a fault on the page. Such faults may be known by many terms such as "page punt", "real time fault", or "page fault".

Under the most popular host based printing technology for personal computers, when the dumb printer encounters a page fault, it informs the user that the last page did not print correctly. If the user chooses to continue printing this job, the faulted page is started over again. The page is rendered as before, however, the resulting raster data is scaled to a lower resolution just before it is sent to the printer. For example, if the page that caused the page fault was a 600×600 dpi page, the raster data of the recovered page will appear to be 300×600 dpi to the printer, even though it started out as a 600 dpi rendered page on the host. This "scaling" to a lower resolution is accomplished by selectively choosing what raster data to send, in total only sending one-half of the data that was rendered for the page. This reduction may be sufficient to allow successful printing of the page. However, in the event that the reduced page incurs another page fault, no further adjustments are made to increase the chance of success. The user is informed in an identical manner and the identical resolution reduction is repeated as long as the user continues to try re-printing the page. The problem with this approach to page fault recovery is two-fold. First, the user is never given an indication that trying to re-print will not have any greater success. Second, the resolution reduction method results in degradation of the printed page. Other solutions involving no degradation while improving the chances of reprinting a page successfully are desirable.

SUMMARY OF THE INVENTION

The present invention is a method for recovering a faulted page. In order to accomplish the present invention, first, a page is transmitted from the host to a printer. If the page causes a fault and the printer supports printing at a slower speed, the printer is slowed down. Next, if the printer cannot be slowed down or a page still faults while printing at the slowest speed, the resolution of the page is determined. If the resolution is a first resolution then the printer is checked to see if it has enough memory. Assuming there is enough memory, it is used to pre-buffer the page prior to starting the printer. If the resolution is a second resolution then first, if the printer has enough memory, try the pre-buffering method. If the page still faults then changing the page's resolution to the first resolution.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1A:
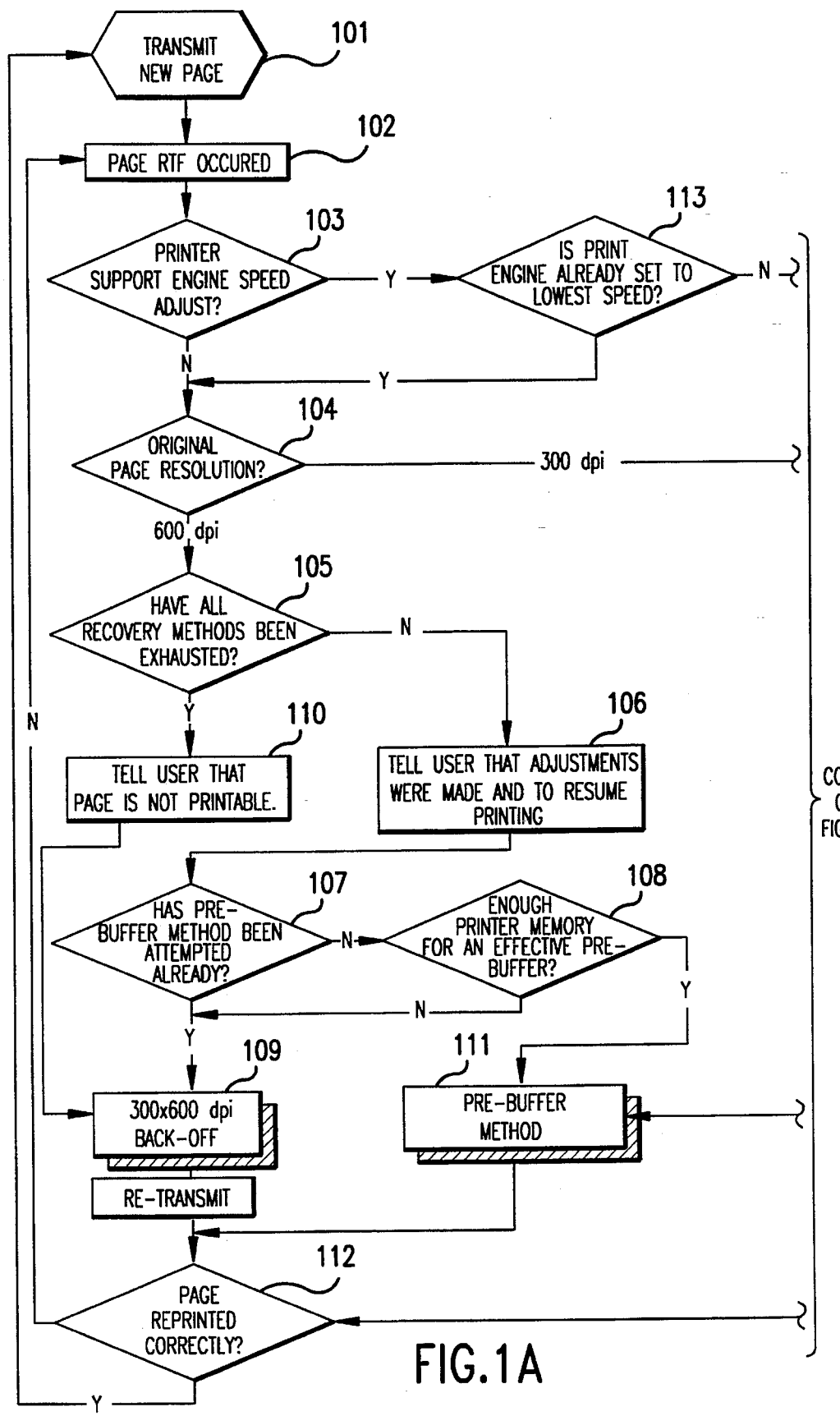
FIG. 1 shows a flow chart of the multi-level back off implementation.

The present invention is not limited to a specific embodiment illustrated herein. The present invention provides more than one level of page fault recovery by selecting a method of recovery based upon known information regarding the printer and prior print history for the faulted page. In the preferred embodiment of the present invention, methods that increases the chance of recovering a faulted page without causing degradation to the of the printed page are attempted first. Resolution reduction is used only when the other methods fail to recover the faulted page. One non-degrading method as described in co-pending U.S. patent application titled, "A HOST BASED PRINTING SYSTEM WITH RASTER IMAGE DATA BUFFERING", Ser. No. 08/533, 626, filed Sep. 25, 1995. In summary, the invention there (herein referred to as pre-buffering method) provides a method of allowing the host computer to control the buffer memory, where the buffer memory is resident in a printer. For the printer to perform the pre-buffering method, the printer receives image data from the host computer. If a start print command has not been received from the host, the printer buffers the image data in the buffer memory. Once the start print command is received, the image data is transferred from the buffer memory to a print engine and the print engine starts printing. If the start print command is received before the image data is received, the printer waits for image data before starting the print engine in motion. Once image data is received it is transferred to the print engine and the print engine is allowed to start printing. Thus, the print engine is not started until both image data is present and a start print command have been received. The host may also transmit to the printer a threshold value. The printer reports back to the host when the buffer memory has less than the threshold value space free. This approach becomes more and more viable as the printer memory pool increases. Yet another non-degrading method used by the preferred embodiment involves directing the printer to slow its engine speed, thus reducing the required supply rate of raster data. The reduced raster data rate significantly increases the chance or recovering a faulted page.

Implementing this multi-level approach involves three primary mechanisms implemented in the host software. First, the host needs to track the recovery methods that have been attempted. Second, the amount of printer memory available for pre-buffering raster data must be evaluated. Third, whether the printer supports multiple engine speeds and how to control such engine speed changes must be known. Keeping track of the number of faulted attempts is accomplished through a counter that is directly associated with each page. Tracking the recovery method attempted is accomplished by assigning a level to each recovery method. Each time a method fails to recover the faulted page, the level is incremented and the method associated with the new level is tried. The printer memory available for pre-buffering raster data is retrieved from the printer and is evaluated at the time the real time fault occurs to determine if it is sufficient to offer a chance of recovery. Printer support of multiple engine speeds is best determined when a page fault occurs.

Figure 1B:
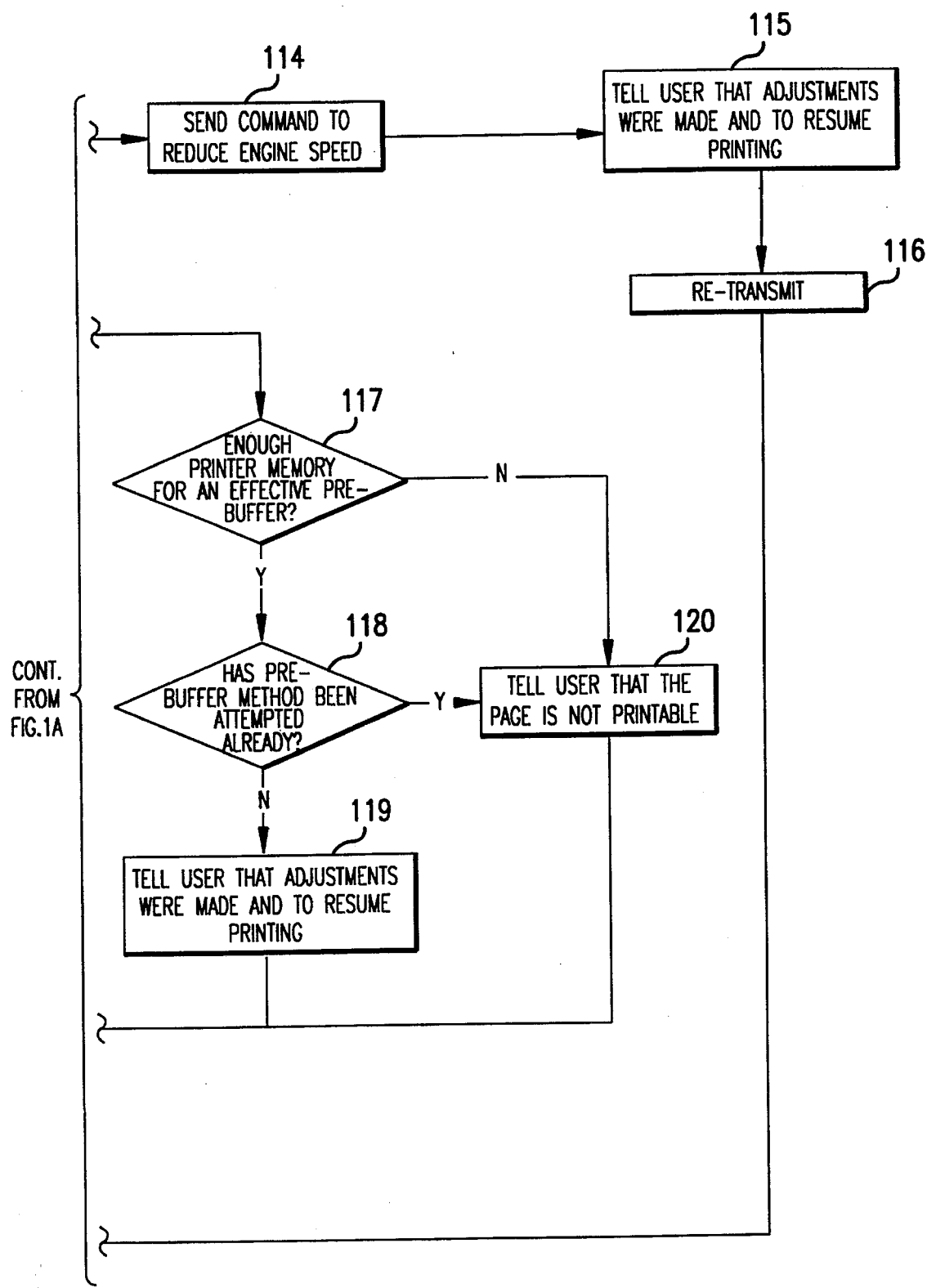

Referring now to FIG. 1, where a flow chart of the multi-level back off implementation is shown. For each new page 101 for which a real time fault occurs 102, it is determined if the printer supports engine speed adjustments 103. If the print engine can be slowed down 113, then, after configuring the printer to print at a slower speed 114, the user is instructed that adjustments have been made 115 and to re-print the page 116. If the page continues to cause a fault, this process is repeated until the print engine is at its slowest speed 113.

With the print engine at its slowest speed, which may be the original speed if the engine does not support multiple speeds, the next level of recovery is based upon the original page resolution 104. In the preferred embodiment, for 300 dpi pages, only one mechanism for increasing the likelihood of recovery exists. First, a determination is made as to whether there is enough printer memory 117. Given enough memory, if the pre-buffer method as described in co-pending application has not already been attempted 118, it is used. The user is notified that adjustments were made and to re-print 119. If the page does not correctly print using the pre-buffer method 111 then subsequent real time fault occurs 112, 102. If the subsequent fault occurs at 300 dpi, then the user is notified that the page is not printable 120.

For 600 dpi pages that remain unrecovered at the slowest print engine speed 105, the user is informed 106, that adjustments are made and to try to print again. Assuming enough memory is present in the printer 107, 108, the pre-buffer method 111 is attempted. In the alternative, where the printer lacks sufficient memory, resolution reduction 109 is attempted. If the page still fails to print 112, 102, a determination must be made whether all back off methods have been exhausted 105. For these conditions where the previous attempt used the pre-buffer method 111, another attempt can be made using the resolution reduction 109. However, if resolution reduction 109 was attempted during the failed attempt, then no other back-off methods exists. It should be noted that the resolution reduction method may also use the pre-buffer method if the printer has enough memory. If all methods have been tried, the user is informed that the page is not printable 110.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method, used in a host based printing system, for recovering a faulted page image, said host based printing system including a printer and a host, said method comprising the steps of:

first transmitting a page image from said host to said printer;

detecting if said page image causes a fault;

determining a resolution of said page image;

if said resolution is a first resolution then:
 checking if said printer has enough memory;
 second transmitting said page image to said printer;
 first pre-buffering said page image in said enough memory;

if said resolution is a second resolution then:
 checking if said printer has enough memory;
 third transmitting said page image to said printer;
 second pre-buffering said page image in said enough memory;
 verifying if said page image prints correctly;
 if said step of verifying verifies that said page image causes a fault then:
 changing said page's image resolution to said first resolution; and
 fourth transmitting said page image to said printer.

2. The method of claim 1 further comprising the step of:

inquiring if said printer supports printing at a slower speed;

selecting, if present, said slower speed; and fifth transmitting said page image to said printer.

3. The method of claim 1 wherein:

said step of first pre-buffering further including the step of first starting said printer when said memory is full; and said step of second pre-buffering further including the step of second starting said printer when said memory is full.

4. A method, used in a host based printing system, for recovering a faulted page, said host based printing system including a printer and a host, said method comprising the steps of:

determining a resolution of said faulted page;

if said resolution is a first resolution then:
 retrieving from said printer an amount of memory in said printer;
 if said amount of memory is greater than a threshold then first pre-buffering said faulted page in said memory;
 if said amount of memory is less than said threshold then informing a user that the faulted page is unprintable;

if said resolution is a second resolution then:
 checking if said printer has enough memory;
 second pre-buffering said faulted page in said enough memory;
 verifying if said faulted page prints correctly;
 if said step of verifying verifies that said faulted page causes a fault then; and
 changing said faulted page's resolution to said first resolution.

5. The method of claim 4 further comprising the step of:

inquiring if said printer supports printing at a slower speed; and selecting, if present, said slower speed.

6. The method of claim 4 wherein:

said step of first pre-buffering further including the step of first starting said printer when said memory is full; and said step of second pre-buffering further including the step of second starting said printer when said memory is full.

7. A method for recovering a faulted page, said method being performed on a host computer, said method comprising the steps of:

first transmitting a page from said host to a printer;

detecting if said page causes a fault;

inquiring if said printer supports printing at a slower speed;

selecting, if present, said slower speed;

second transmitting said page to said printer;

determining a resolution of said page;

if said resolution is a first resolution then:

checking if said printer has enough memory;

third transmitting said page to said printer;

pre-buffering said page in said enough memory;

if said resolution is a second resolution then:

checking if said printer has enough memory;

fourth transmitting said page to said printer;

second pre-buffering said page in said enough memory;

verifying if said page prints correctly;

if said step of verifying verifies that said page causes a fault then:

changing said page's resolution to said first resolution; and fifth transmitting said page to said printer.

8. The method of claim 7 wherein:

said step of first pre-buffering further including the step of first starting said printer when said memory is full; and said step of second pre-buffering further including the step of second starting said printer when said memory is full.

* * * * *